US012255306B2

(12) United States Patent
Schumacher et al.

(10) Patent No.: US 12,255,306 B2
(45) Date of Patent: Mar. 18, 2025

(54) SOLID-STATE LITHIUM ION CONDUCTOR

(71) Applicant: SCHOTT AG, Mainz (DE)

(72) Inventors: Jörg Schumacher, Kornwestheim (DE); Philipp Treis, St. Aldegund (DE); Ulrike Stöhr, Mainz (DE); Thomas Kirsch, Mainz (DE); Wolfgang Schmidbauer, Mainz Finthen (DE); Andreas Roters, Mainz (DE)

(73) Assignee: SCHOTT AG, Mainz (DE)

( * ) Notice: Subject to any disclaimer, the term of this patent is extended or adjusted under 35 U.S.C. 154(b) by 176 days.

(21) Appl. No.: 17/244,043

(22) Filed: Apr. 29, 2021

(65) Prior Publication Data

US 2021/0343996 A1 Nov. 4, 2021

(30) Foreign Application Priority Data

Apr. 29, 2020 (DE) ...................... 10 2020 111 658.6

(51) Int. Cl.
H01M 4/04 (2006.01)
C01B 25/45 (2006.01)
C01G 25/00 (2006.01)
H01M 4/485 (2010.01)
H01M 4/58 (2010.01)

(52) U.S. Cl.
CPC ........... H01M 4/0471 (2013.01); C01B 25/45 (2013.01); C01G 25/006 (2013.01); H01M 4/485 (2013.01); H01M 4/5825 (2013.01); C01P 2002/30 (2013.01); C01P 2002/54 (2013.01); C01P 2002/72 (2013.01); C01P 2004/60 (2013.01); C01P 2006/40 (2013.01); C01P 2006/82 (2013.01)

(58) Field of Classification Search
None
See application file for complete search history.

(56) References Cited

U.S. PATENT DOCUMENTS

| 8,821,771 | B2 * | 9/2014 | Badding | ................. | C01B 25/45 264/80 |
| 2004/0196887 | A1 | 10/2004 | Schmidbauer | | |
| 2006/0021285 | A1 * | 2/2006 | Rosenflanz | ............. | C04B 35/44 51/309 |
| 2009/0159839 | A1 * | 6/2009 | Seino | ...................... | C03C 10/00 252/182.1 |
| 2014/0205890 | A1 | 7/2014 | Okada | | |
| 2016/0049655 | A1 * | 2/2016 | Fasching | ............... | H01M 4/131 264/5 |
| 2016/0329598 | A1 * | 11/2016 | Schneider | ............... | C03C 3/125 |
| 2019/0173130 | A1 | 6/2019 | Schuhmacher | | |
| 2019/0207252 | A1 * | 7/2019 | Badding | ............... | H01M 4/505 |
| 2019/0241463 | A1 | 8/2019 | Schneider | | |
| 2020/0235421 | A1 * | 7/2020 | Zhou | ................. | H01M 10/0562 |

FOREIGN PATENT DOCUMENTS

| DE | 19939782 | 5/2001 | |
| DE | 102014100684 | 5/2017 | |
| DE | 102017128719 | 6/2019 | |
| DE | 102018102387 | 6/2019 | |
| EP | 1284299 | 2/2003 | |
| EP | 1760819 | 3/2007 | |
| EP | 2086039 | 8/2009 | |
| EP | 3410529 | 12/2018 | |
| JP | 2013219017 | 10/2013 | |
| JP | 2017061397 | 3/2017 | |
| WO | WO-2013042777 A1 * | 3/2013 | ............. C01B 25/45 |
| WO | 2017141742 X | 8/2017 | |

OTHER PUBLICATIONS

Murugan, Fast Lithium Ion Conduction in Garnet-Type $Li_7La_3Zr_2O_{12}$ Angew. Chem. Int. Ed. Eng. 46, (2007), pp. 7778-7781.
DIN 19539, "Investigation of solids—Temperature-dependent differentiation of total carbon (TOC400, ROC, TIC900)", Dec. 2016, 41 pages with English translation.
Pronina, "Cooling history of a wet-granulated blast furnace slag (GBS)", Journal of Non-Crystaline Solids, 499 (2018) 344-349.
Imanishi, "Solid Electrolytes for Aqueous Lithium Air Batteries", 2014, 215-234.
Yow, "Effect of Li+/H+ exchange in water treated Ta-doped Li7La3Zr2O12", Solid State Ionics, 292 (2016) 122-129.
Jin, "Li7La3Zr2O12 electrolyte stability in air and fabrication of a Li/Li7La3Zr2O12/Cu0.1V2O5 solid-state battery", Journal of Power Sources 239 (2013) 326-331.
Wang, "Phase transition in lithium garnet oxide ionic conductors Li7La3Zr2O12: The role of Ta substitution and H2O/CO2 exposure", Journal of Power Sources, 275 (2015) 612-620.
Liu, "Reversible ion exchange and structural stability of garnet-type Nb-doped Li7La3Zr2O12 in water for applications in lithium batteries", Journal of Power Sources, 282 (2015) 286-293.

(Continued)

Primary Examiner — Tanisha Diggs
(74) Attorney, Agent, or Firm — Ruggiero McAllister & McMahon LLC

(57) ABSTRACT

The disclosure relates to a method for producing a solid-state lithium ion conductor material in which the use of water and/or steam is a medium when the obtained intermediate product is cooled or quenched and, if needed, comminution of the intermediate product and/or carrying out of a cooling process with the production of a powder in one comminution step or in a plurality of comminution steps leads or lead to especially advantageous production products. The subject of the disclosure is also the solid-state lithium ion conductor material that has an ion conductivity of at least $10^{-5}$ S/cm at room temperature as well as a water content of <1.0 wt %. The disclosure further relates to the use of the solid-state lithium ion conductor material in the form of a powder in batteries or rechargeable batteries, preferably lithium batteries or rechargeable lithium batteries, in particular, separators, cathodes, anodes, or solid-state electrolytes.

25 Claims, 3 Drawing Sheets

(56) References Cited

OTHER PUBLICATIONS

Nyman, "Alternative Approach to Increasing Li Mobility in Li-La-Nb/Ta Garnet Electrolytes", Chem. Mater., 22 (2010) 5401-5410.
Duan, "Stability of garnet-type Li ion conductors: An overview", Solid State Ionics, 318 (2018) 45-53.
Kang, "First-Principles Study of Chemical Stability of the Lithium Oxide Garnets Li7La3M2O12 (M=Zr, Sn, or Hf)." J. Phys. Chem. C, 118 (2014) 17402-17406.
Jiang, "Recent progress on the Li7La3Zr2O12 ( LLZO ) solid electrolyte", Energy Storage Science and Technology, . vol. 9, No. 2, Mar. 2020, with English machine translation, 41 pages.
Zhu, "Preparation and Sintering Densification of Nanocrystalline NASICON Solid Material", Journal of Inorganic Materials, May 2004, vol. 19, No. 3, with English machine translation, 19 pages.

\* cited by examiner

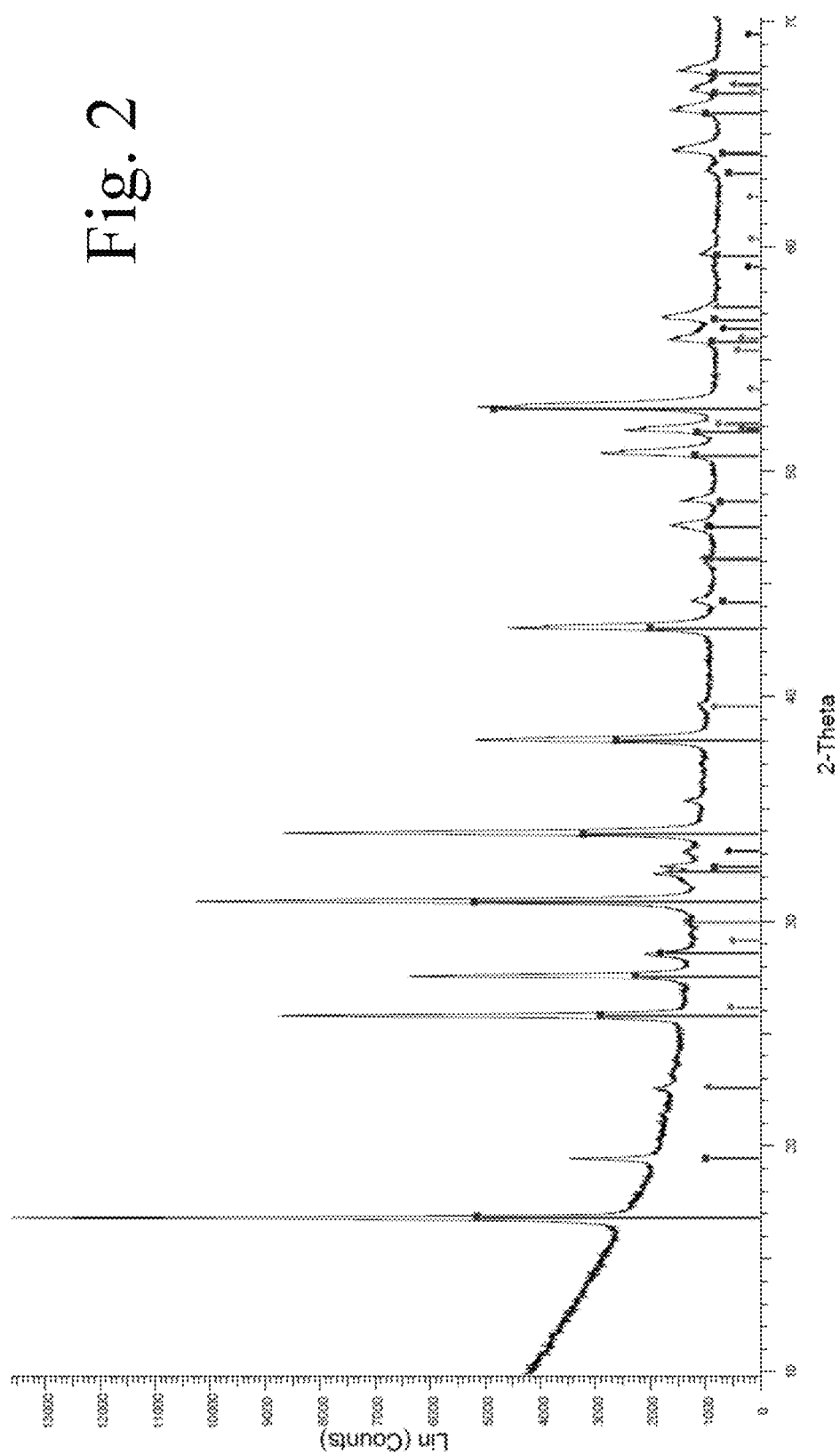

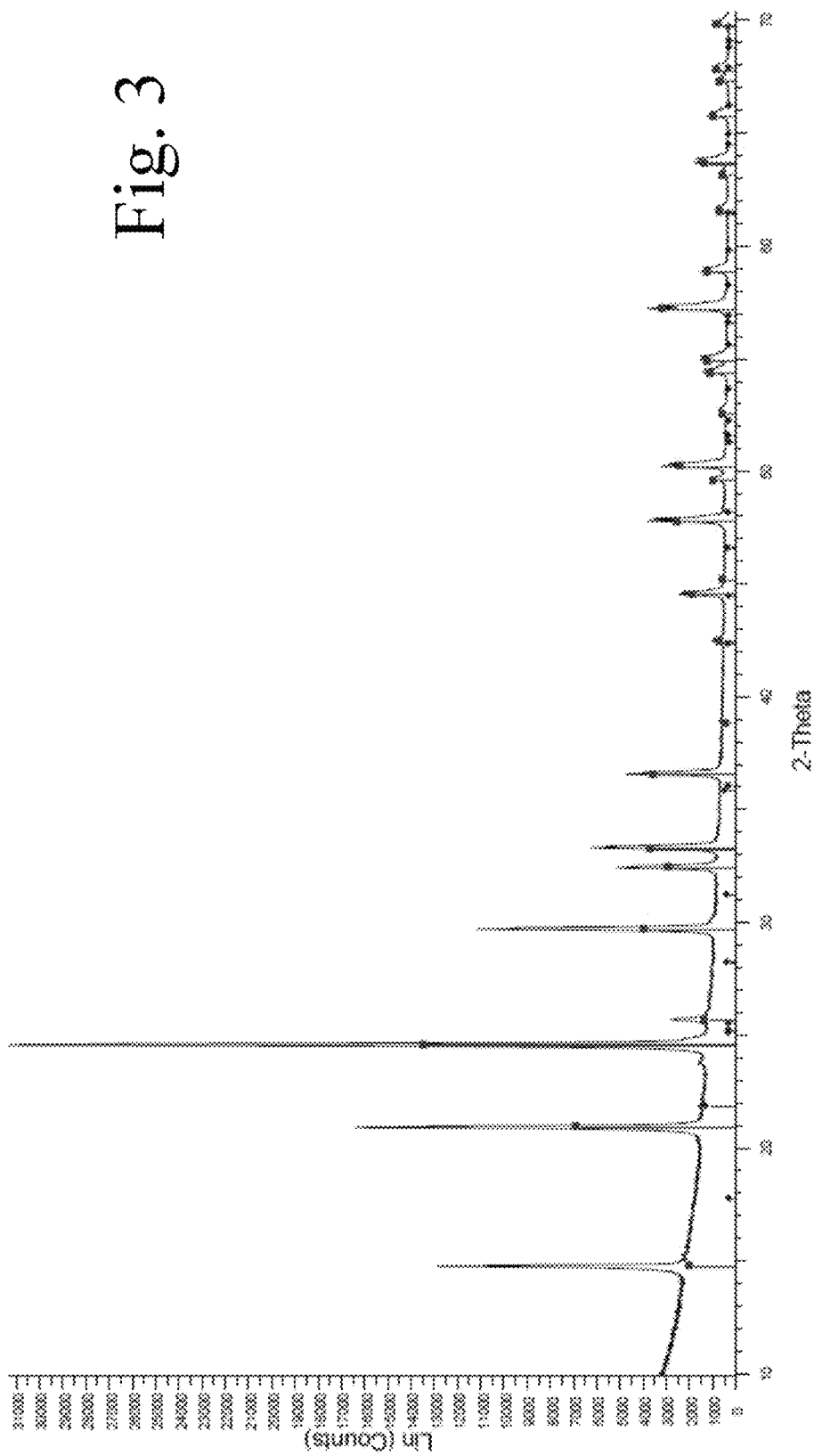

SOLID-STATE LITHIUM ION CONDUCTOR

CROSS-REFERENCE TO RELATED APPLICATION

The present application claims the benefit of German Patent Application No. 10 2020 11 658.6, filed on Apr. 29, 2020, which is herein incorporated by reference.

BACKGROUND OF THE DISCLOSURE

1. Field of the Disclosure

The present disclosure relates to a solid-state lithium ion conductor, a method for producing the solid-state lithium ion conductor, and use thereof.

2. Discussion of the Related Art

In battery technology, battery systems based on lithium ions have become increasingly widespread in recent years. They are characterized, in particular, by their high electrical energy density and the long service life to be expected, so that more efficient battery configurations become possible. The high chemical reactivity, the low mass of lithium ions, and their high mobility play a central role. Therefore, there is great interest in the development of solid-state lithium ion conductors.

In solid-state batteries or solid-state rechargeable batteries, both the electrodes and the electrolyte are composed of solid material. In solid-state batteries that are based on lithium ions as charge carriers, post-lithium-ion batteries are used. The lithium ion batteries themselves are characterized by the use of graphite as the anode material. The lithium ions can intercalate in this anode material when the battery is charged. During discharge, they again exit therefrom. Parallel to this, electrons are taken up by the graphite host system via the external current circuit and are once again released during discharge. In post-lithium-ion batteries, in contrast, elemental lithium is often employed as the anode material. In comparison to a graphite anode, this makes possible a significantly higher energy storage density. Lithium batteries likewise are present in these cases. The general advantage of lithium-based solid-state batteries or rechargeable batteries here is that the liquid electrolyte, which is often a fire hazard or is toxic, is replaced and an improvement in the safety of lithium-based batteries is thereby made possible.

The integration of a solid-state lithium ion conductor in the battery usually occurs in powder form, with the solid-state conductors being mixed with other battery components, such as, for example, active materials or polymers, and optionally sintered or else sintered and compacted together with further additives. However, in this case, high contact resistances often ensue and only low conductivities are achieved in the sintered components.

Glasses with a high alkali content, in particular, a high Li content, normally exhibit a high tendency to undergo leaching of these ions out of the glass matrix.

In addition, based on the current knowledge in the field, it would be expected that a method that uses water or steam as a forming medium or contact medium cannot come into consideration for the production of phosphate-based solid-state lithium ion conductor materials, in particular lithium aluminum titanium phosphate LATP.

The present disclosure addresses these disadvantages of currently available batteries.

SUMMARY OF THE DISCLOSURE

The present disclosure is based on the object of overcoming the drawbacks of the prior art and of providing a solid-state lithium ion conductor material that exhibits sufficient water resistance, so that it can be prepared using water and/or steam, but nonetheless, manifests the required functionality as a lithium ion conductor in the form of an adequately high conductivity.

In a surprising way, it was found that the production of solid-state lithium ion conductor materials by using water and/or steam as a medium in the heating process and/or in the cooling process leads to especially advantageous production products. This is totally unexpected, because, proceeding from the experience described in the prior art, the processing of solid-state lithium ion conductor materials in water as a medium is not only regarded as being disadvantageous, but is also regarded as being totally impossible to carry out in terms of the stability of the material, the phase purity, and the adjustment of the optimal crystal modification, as well as in terms of the functionality thereof with respect to the lithium ion conductivity.

Accordingly, the present disclosure provides a method for producing a solid-state lithium ion conductor material, the method comprising the following steps:
(1) providing starting products of a solid-state lithium ion conductor material;
(2) carrying out at least one heating process with the starting products of the solid-state lithium ion conductor material to obtain an intermediate product, wherein the heating process is selected from the group consisting of a melting process, a sintering process, a ceramization process, a calcination of a sol-gel precursor, and a bottom-up synthesis in the pulsation reactor;
(3) cooling or quenching of the intermediate product; and
(4) carrying out a cooling process with the production of a powder in one comminution step or in a plurality of comminution steps;
wherein, in step (3) and/or step (4), the intermediate product is brought into contact with water and/or steam and is subsequently dried.

BRIEF DESCRIPTION OF THE DRAWINGS

FIG. 2 is an x-ray diffraction plot of a second example of a lithium ion conductor material according to the present disclosure.

FIG. 3 is an x-ray diffraction plot of a third example of a lithium ion conductor material according to the present disclosure.

DETAILED DESCRIPTION OF THE DISCLOSURE

Figure 1:
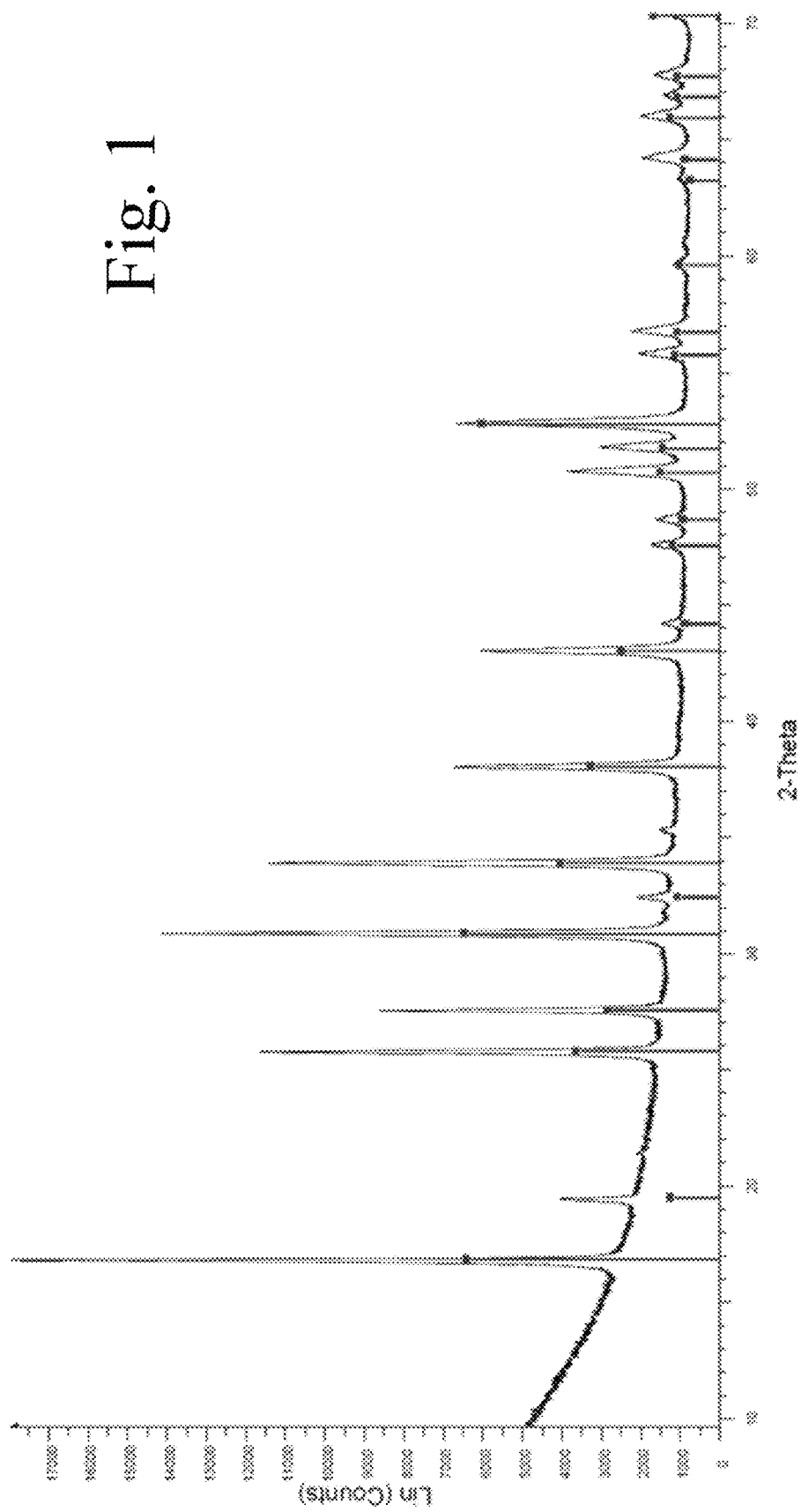
FIG. 1 is an x-ray diffraction plot of a first example of a lithium ion conductor material according to the present disclosure.

In the method of the disclosure, lithium ion conductor materials are produced in a plurality of steps.

In step (1) of the method according to the disclosure, the starting products of a solid-state lithium ion conductor material are provided. The disclosure is not further limited in this regard, provided that the solid-state lithium ion conductor material can be produced by way of a melting process, a sintering process, a ceramization process, a calcination of a sol-gel precursor, or a bottom-up synthesis in the pulsation reactor. Solid-state lithium ion conductor materials of this kind are known to the person skilled in the art. They are, for example, solid-state lithium ion conductor materials based on a NASICON structure. The NASICON structure is a structure that is built up of edge-linked $PO_4$ tetrahedra and octahedra, such as, for example, $TiO_6$ octahedra or $GeO_6$ octahedra. The NASICON structure makes possible a facile migration of Li ions through the crystal lattice. The solid-state lithium ion conductor materials based on a NASICON structure are preferably chosen from materials based on lithium aluminum titanium phosphate (LATP) and/or based on lithium aluminum germanium phosphate (LAGP).

Other solid-state lithium ion conductor materials that can be produced are those based on a garnet structure. They are preferably chosen from materials based on lithium lanthanum zirconium oxide LLZO.

The term "based" or "based on," such as, for example, based on lithium aluminum titanium phosphate (LATP), means that, in each instance, the known basic structure exists, however, departures from the basic structure that are known from the prior art may be present. They can be, for example, additional dopings with other elements, such as, for example, tantalum, aluminum, niobium, zirconium, gallium, yttrium, silicon, germanium, tellurium, chromium, iron, scandium, boron, rare earths, halides, as well as alkali metals and alkaline earth metals. These dopings are known from the prior art. The term therefore encompasses all compounds that fall under the general broader term.

In the method according to the disclosure, the starting products for the solid-state lithium ion conductor material are initially provided; that is, the corresponding oxides, hydroxides, carbonates, sulfates, or also other salts are supplied.

For the starting products of a solid-state lithium ion conductor material that crystallizes on the basis of a garnet structure, preferably a material composition that, in comparison to a stochiometric composition, has an excess of lithium is chosen. In relation to the unit formula of the stochiometric crystal, the excess of lithium lies in the molar range preferably at 2% to 100%, especially preferred at 2% to 25%.

In the case of solid-state lithium ion conductor materials based on a NASICON structure, the method according to the disclosure can be carried out, as a rule, with the unaltered starting products of the raw material without the addition of lithium, that is, without an Li excess.

The provided starting products are then subjected in step (2) to a heating process, comprising a melting process, a sintering process, a ceramization process, a calcination of a sol-gel precursor, or a bottom-up synthesis in the pulsation reactor.

The heating process can comprise, for example, a melting of the starting products. Alternatively, it is also possible to employ a sintering, in particular a solid-state sintering, at a temperature that lies below the melting temperature of the starting products.

A ceramization takes place preferably as an intermediate step, which, for example, is optional in the case of LATP.

A further heating process is the calcination of a sol-gel precursor. First, the production of a precursor takes place in a sol-gel process by way of wet chemistry and, as a rule, at relatively low temperatures. Obtained in a sol-gel process, after removal of the solvent by drying, is a precursor that is transformed into the desired material form by calcination as the heating process step.

What is involved in a bottom-up synthesis in the pulsation reactor is likewise a heating process that is known to the person skilled in the art, because the synthesis reaction occurs in a pulsating flow of hot gas. In this case, the exhaust gas formed is usually used in a combustion reaction.

The entire heating process can comprise one step or a plurality of steps or one partial process or a plurality of partial processes. The given heating process(es) can be followed by one post-treatment step or a plurality of post-treatment steps, which then likewise represents or represent heating processes. The heating processes can each follow one another directly without other intermediate steps; that is, one heating process occurs or a plurality of heating processes occur in succession. Between the individual heating processes, the intermediate product can be cooled to room temperature in each instance. However, this is not required in each case. The post-treatments—for example, in the form of an annealing, preferably in a furnace with a defined temperature-time program for the heating, holding, and cooling, and with intermediate holding steps in each instance as needed—serve for adjustment of the desired crystal modification and/or crystallite size.

Overall, the heating process serves for producing the desired multi-material system and can comprise, for example, the following processes:
  a melting process that entails melting of the two or more starting products provided in order to form a glass and transformation of the glass into a glass ceramic by suitable cooling and, if needed, after the cooling,
  carrying out of a further ceramization step in the form of an annealing, for example, in an oven with a defined temperature-time program for the heating, holding, and cooling, and with intermediate holding steps in each instance, if needed, for adjustment of the desired crystal modification and/or crystallite size;
  a sintering process for sintering the two or more starting products provided at high temperatures, but below the melting temperature of the starting products, in the scope of a solid-state reaction;
  a calcination of a sol-gel precursor, which comprises a calcination of a precursor that has been produced in a sol-gel process; or
  a bottom-up synthesis in the pulsation reactor and optional subsequent post-calcination for adjustment of the crystal modification and/or crystallite size.

The heating process in accordance with step (2) of the method is followed in step (3) by a cooling or quenching of the hot intermediate product obtained. In this case, the intermediate product can be brought into contact with water and/or steam and subsequently dried. The cooling or quenching can also take place without water or steam. In general, the cooling or quenching can represent, for example, a free or controlled cooling or quenching to room temperature. The hot intermediate product can be cooled, for example, by bringing it into contact with cold water, with cold air, or with cold, good heat-conducting materials and is subsequently dried. The cooling or the quenching can also take place in another way known to the person skilled in the art.

In accordance with a preferred embodiment of the disclosure, in step (3), when the hot intermediate product obtained is cooled or quenched, the intermediate product is comminuted at the same time. The comminution comprises, for example, atomization of the hot intermediate product to form droplets or separation of the hot intermediate product to obtain particles, such as, for example, coarse particles. When step (3) is being carried out, the hot intermediate product can come into contact with water and/or steam. In accordance with this embodiment, therefore, step (3) represents a hot shaping process.

Step (3), as a hot shaping process in the form of an atomization or fritting, serves for the cooling or quenching of the material with the formation of an intermediate product having as few crystal phases as possible and, accordingly, the highest possible amorphous or glass phase fraction. In this way, the danger of an uncontrolled formation of undesired crystal phases, as a result of an uncontrolled temperature-time course during cooling, is averted.

Furthermore, by step (3) as a hot shaping process, it is advantageous when an intermediate product that proves to be especially expedient in the downstream comminution processes is produced. Thus, particles that are formed in an atomization process or in a fritting process or else glass ribbons that are produced by cooling on a rolling machine—an alternative cooling or quenching method without water contact—can be comminuted markedly better than large monolithic blocks.

In accordance with a preferred embodiment, the obtained hot, preferably still liquid intermediate product is cooled or quenched in step (3) and comminuted at the same time, and are thereby brought into contact with water and/or steam. Especially preferred, this occurs by atomizing the liquid intermediate product to form droplets with the use of water as the atomization medium. The atomization medium in the form of water can be guided as a jet of water in a water chute, or via a nozzle, for example.

In the case of a water chute, the obtained liquid intermediate product, which was produced via a melting process in accordance with step (2) of the method according to the disclosure, is passed in a jet via a melt feed onto a "water chute." The water chute serves to quench or to cool the droplets in water. When the melt impinges on the flowing film of water, the melt jet is divided into fine droplets.

The viscosity of the liquid intermediate product used can lie, for example, in the range of 0.1 to 1 dPa at a temperature of 1450° C. to 1600° C. On a water chute, water flows at high velocity—for example, with a throughput of 0.1 to 3 $m^3$/min, especially preferred 1.7 $m^3$/min—via an inclined channel, preferably a stainless steel channel. The angle of inclination of the water chute can thereby be adjusted at will, with 10-75° being preferred and 45° being most preferred.

In the case of the water chute, preferably the entire wall of the channel is covered at the bottom with a film of water. The droplets that are produced from a cushion of vapor by contact with the film of water, which prevents any further contact of the droplets with the water. The water chute differs from a water bath in that it is possible to use a water chute to adjust the diameter of the droplets of the material in a defined way. Preferably, it is possible to adjust the diameter of the droplets as a function of the distance of the melt feed from the water chute, the angle of inclination of the water chute—for example, in the range of 10-75°, preferably 45°—and, the adjusted amount of water flow in the range of 0.1-3 $m^3$/min, preferably 1.7 $m^3$/min, for example. Preferred diameters of the droplets are less than 20 mm, such as, for example, 19.99 mm or less, preferably less than 10 mm, such as, for example, 9.99 mm or less, especially preferred in the range of 0.5-1 mm.

Accordingly, the droplets have no direct contact with the underlying material of the water chute. The droplets move, for example, in a trajectory toward a collection vessel or they are entrained by the jet of water and trapped or collected in a suitable collection tank. Immediately following the comminution of the melt jet into droplets or during the period of time when they are in flight movement, the droplets solidify. When they impinge in the collection tank, they are already solid, but they are still very hot (>700° C.) and, accordingly, as a rule, above the ceramization temperature determined by use of a DTA (differential thermal analysis) measurement. Preferably, the collection vessel can be cooled. When they are immersed, the solid particles are therefore cooled so fast that no crystallization or only slight crystallization ensues. Accordingly, a nearly completely amorphous glass (ceramic) granulate is obtained.

The use of a water chute has great advantages. Thus, the hot liquid intermediate product, which is obtained from the melting process, can be comminuted to form particles directly without any intermediate step. The particle size can be adjusted in a defined manner, so that, in the subsequent cooling process, it is possible to reduce markedly the number of additional comminution steps and the energy required for them. Overall, the method is simplified in this way and becomes more economical. This has an impact, in particular, on large-scale industrial production.

Alternatively, the jet of water can also be produced by means of a nozzle, for example, without the use of a chute, and can be diverted directly onto the molten jet of the intermediate product.

Through the use of water as the atomization medium, the droplets come into direct contact with water only to a subordinate extent, because the cushion of water vapor traps them. The fact that, immediately when the water and the melt meet, a water vapor cushion is present between the two media means so that a potential leaching of Li ions at this point in the process is prevented or is at least kept as small as possible.

A quenching of glass melts in water—such as in a water chute—has already become known from the prior art, but has hitherto been used in totally different fields, such as, for example, in the case of granulate production from blast furnace slags or else in the case of polymers. This technology has hitherto not been employed for lithium ion conductor materials.

Thus, a quenching of melts has been employed, for example, for producing granulates from blast furnace slags, which are obtained as a side product in the steel industry (Journal of Non Cryst. Solids 499 (2018) 344-349 or EP 1284299). In this process, the liquid slags are cooled and granulated rapidly with the use of a jet of water, leading to glassy solidification and, at the same time, comminution. In a totally surprising way and in departure from common ideas and concepts of the prior art, this approach can be employed for producing lithium ion conductors, whereby the detrimental washing out of Li that is to be expected and the associated detrimental effect on the ion conductivity is not obtained. Due to the use of water, other detrimental effects could also not be ascertained.

The usual method for producing lithium ion conductors by way of a melting process comprises a rapid quenching by way of contact with cold, good heat-conducting materials, like metallic materials, such as, for example, rollers, casting molds, and the like. However, the use of metallic materials entails the risk of a contamination of the ion-conducting material, which could have a detrimental effect on the electr(on)ic conductivity. What is meant thereby is that the electr(on)ic conductivity in ion-conducting materials should be kept as small as possible. Metal abrasion could increase this conductivity to an undesired extent. In battery application, the electric current flows via the outer electric circuit; that is, it is available to the consumer in the form of a device or a piece of equipment and not inside of the battery, where the ion conduction should predominate.

In accordance with the disclosure, therefore, the quenching and comminution with the use of water, in particular by use of a jet of water that is introduced via an atomization nozzle or conducted in a water chute or the like, for example, is especially preferred for producing a lithium ion conductor.

Insofar as the intermediate product in step (3) has been brought into contact with water and/or steam, a drying of the intermediate product preferably occurs. This can be carried out in a way known to the person skilled in the art.

It has been found to be especially advantageous when the cooling or quenching operation of the hot intermediate product in step (3), preferably with shaping, is carried out in or with water and/or steam. The use of water and/or steam has numerous advantages: The jet of water or the steam can be utilized in a continuous melt flow after the melt has been obtained and serves as a medium in order to atomize the melt to form small particles immediately after the melt exits the melting crucible. This particle formation facilitates the subsequent rapid cooling on account of an enlargement of the surface as well as due to the subsequent further comminution steps. Following an atomization, it is advantageous to transfer the particles to water in order to achieve a cooling and thus a hardening that is as rapid as possible. In addition, water is especially cost-effective and can therefore also be employed in large-scale industrial production without anything further.

In the method according to the disclosure, a shaping process during the heating process and a cooling or quenching operation after the heating process are preferably chosen such that they optimally prepare for the following cooling process steps and influence the product properties as positively as possible, and not negatively. "Optimally prepare for" is understood to mean that the step or the steps of the heating process is or are carried out in such a way that individual steps of the cooling process chain are dispensed with or can be simplified more or less markedly. This refers, for example, to a decrease in the required grinding time or in the grinding energy that needs to be introduced. For example, this could be achieved by a skillful centrifugation or atomization of the melt, as a result of which adequately small frit particles are created, which could be supplied as a feed material directly to a fine grinding process, without the necessity of a separate, possibly multistage coarse comminution process, such as, for example, crushing in a jaw crusher with subsequent coarse grinding in a ball mill or in a disk mill. A further possibility would be to introduce stresses into the glassy material by especially rapid quenching, for example, so that the crushing of the feed material in a downstream comminution process is thereby facilitated. This approach is especially advantageous in accordance with the disclosure.

In an optional intermediate step that follows step (3) of the method according to the disclosure and occurs prior to step (4), the cooled intermediate product can be subjected to an annealing in a furnace, for example. For this purpose, annealing is conducted for adjustment of the desired crystal structure by using a defined temperature-time program for the heating, holding, and cooling, in each case with intermediate holding steps if needed. The defined temperature-time program depends on, among other things, the chosen starting products, the amount thereof, the obtained solid material, the desired fraction as well as the kind of the crystal phase, the crystal size, the grain structure/microstructure, and the geometric size and homogeneity of the starting material in the form in which it is delivered (for example, frit particles, ribbons, etc.). The temperature that is at least required for the creation of a desired crystal phase is obtained, for example, from the position of the crystallization peak determined by use of differential thermal analysis. Besides the temperature-time program, the atmosphere that is chosen for the annealing, that is, the process gas used here (for example, air, oxygen, inert gases such as nitrogen or argon, decarbonized air) as well as the adjusted moisture content also play a role. The person skilled in the art can resort to knowledge from the prior art. The annealing can represent, for example, a calcination, a ceramization, a sintering, or another hot process.

For adjustment of the desired crystal phase fraction and phase composition, it is possible to carry out an additional tempering step (repetition of the optional intermediate step). This is dependent on each individual case.

A further advantage of the optional intermediate step, besides the adjustment of the desired crystal phase fraction and phase composition, is that, owing to the annealing, any residual water that is present is expelled from the material to the greatest extent possible.

The intermediate product that is obtained after step (3) or after the optional intermediate step has been carried out, but before step (4) is carried out, can solidify in a glassy or glass-ceramic-like state, for example, and is therefore x-ray amorphous in large part. The exact crystal fraction as well as, if needed, the fraction of different crystal phases can be adjusted, for example, by way of the cooling history, that is, the choice of process conditions. Depending on the adjustment of the process conditions, the intermediate product therefore has a more or less high fraction of crystal phase.

Depending on the combination of heating processes and cooling operations in each case, the raw product is obtained in the form of a solid body, ribbons, a frit, a granulate, or coarse particles as intermediate. The particles often exhibit cracks or at least internal stresses, which are especially advantageous for the subsequent cooling process, because, as a result thereof, the particles can be comminuted more simply and with less grinding energy.

The method steps of the heating processes can preferably follow one another in direct succession without additional method steps.

Step (3), which is followed, if needed, by the optional intermediate step in the form of an annealing, is then followed by a cooling process in accordance with step (4), which likewise comprises one step or a plurality of steps in the form of comminution processes for producing the powder as the actual form for use.

In the cooling process of step (4), a powder is produced from the obtained intermediate product in one comminution step or in a plurality of comminution steps, whereby, preferably in at least one comminution step, it is brought into contact with water and/or steam. Accordingly, in the subsequent cooling process, by use of one comminution step or a plurality of comminution steps, the raw product is transformed into the powder form having the desired particle size and particle size distribution.

Preferably, the cooling process comprises one or a plurality of the following steps:
  comminution with hammer and chisel;
  comminution with roller crusher and/or jaw crusher,
  comminution with ball mill and/or hammer mill;

comminution with ball mill, impact mill, and/or planetary mill;
comminution with vibrating disk mill,
comminution with counterjet mill, spiral jet mill, and/or steam-jet mill
comminution with dry ball mill and/or wet ball mill;
comminution with dry agitator ball mill and/or wet agitator ball mill;
comminution by high-energy grinding in high-kinetic rotary ball mill.

In this connection, it should be mentioned that mills can be classified according to three kinds, namely, the type of drive, the product, and the function. The above mills are classified according to function in this case.

In the prior art, the cooling processes, that is, the comminution steps, are routinely carried out under dry conditions, although this is not always expedient. In an unexpected way, it is now possible to carry out a wet fine grinding of the solid-state lithium ion conductor materials to suitable small particle sizes. Thus, in many cases, the grinding can take place to produce particle sizes in the lower one-digit μm range or sub-μm range only in a fine grinding process in a liquid medium in, for example, an agitator ball mill. In accordance with the disclosure, this is now possible for solid-state lithium ion conductor materials. From an economic viewpoint, moreover, the use of a liquid grinding medium, such as, for example, water, is especially expeditious. Alternatively, it is also possible to use a counterjet mill, in which superheated steam is used as the process gas.

The use of water in the cooling process as the process medium—whether it be in liquid form or whether it be steam, in particular superheated steam—for producing a solid-state lithium ion conductor in the use form as a powder is therefore of great advantage for attaining the desired particle size. In addition, water and steam pose no problems in handling, are non-toxic, and can also be used in large-scale industrial production in large amounts and, in economic terms, are especially cost-effective and reusable. In addition, the use of water makes it possible to adjust the particle size to be very small, this being not possible at all or only very difficult to implement by the use of other methods. The use of water and/or steam in the cooling process is therefore advantageous and, as a rule, is even preferred.

Insofar as the product is brought into contact with water and/or steam in at least one comminution step, preferably a drying is carried out, with a residual water content remaining in the dried product. As a drying method, it is possible to employ, for example, freeze drying. This is carried out, in particular in the case of wet grinding, in condensed water. In the case of grinding with the use of steam, preferably another drying method is used. Freeze drying has the advantage that, in this way, it is possible to carry out the drying in a very gentle way at especially low temperature, this being especially advantageous, therefore, for the production of the solid-state lithium ion conductor materials according to the disclosure. The freeze drying is preferably employed only after the fine grinding. The product produced thereby has a high specific surface area (>0.5 m$^2$/g), so that the small particles can then interact with one another and—in particular when a simple thermal drying is used—could form agglomerates or even aggregates that are difficult to break apart. The freeze drying counteracts this phenomenon. Other methods for drying, preferably a gentle drying, are likewise possible.

Step (4) can be followed, preferably directly at step (4), without an intermediate step, by a step (5), by which any remaining residual water content can be removed by a thermal treatment. This step (5) is an optional step, which would not be required in a particular carrying out of the method—for example, in the case of fritting in water and subsequent dry grinding. Step (5) comprises the carrying out of a thermal treatment for removal of the remaining residual water in the product obtained at a temperature of at least 200° C., with the thermal treatment being carried out in the absence of $CO_2$ in the ambient atmosphere to obtain a powder of a solid-state lithium ion conductor material with a water content of <1.0 wt %.

It has been found that, if a loading of the solid-state ion conductor material with water takes place during the preceding corresponding processing steps, this water can be removed once again without notable impairment to the material and the functionality thereof, if the intermediate product that has been loaded with water is treated in a defined thermal treatment step in accordance with the optional step (5) at a temperature of at least 200° C., preferably at least 300° C., preferably at least 400° C., more preferably at least 500° C. An upper limit for the temperature depends greatly on the base material as well as on the individual modifications. In addition, the effectiveness of expelling even tightly bound water increases with increasing temperature. Above 400 to 500° C., however, there is the danger of encountering a problem with sintering and undesired aggregate formation or decomposition of the functional structural components. The temperature can also be exceeded, depending on the individual case.

The aim of the method of the disclosure is to obtain in each case a powder, the particles of which are composed of a lithium ion conducting material with a conductivity of at least $10^{-5}$ S/cm at room temperature and which, in spite of contact with liquid water or steam during its production, has a water content of only <1.0 wt %, preferably 0.99 wt % or less.

The method steps of the cooling process can follow one another in succession, preferably directly without additional method steps.

The method according to the disclosure is also suitable for the production of solid-state lithium ion conductor materials on a large industrial scale. A high-volume preparation of solid-state lithium ion conductor materials in powder form is then possible from an economic viewpoint, in particular when cost-effective processes are employed for production along the entire process chain. The use of water and/or steam is thereby of special advantage.

The subject of the disclosure is also a solid-state lithium ion conductor material in the form of a powder that can be obtained by the above-described method of the present disclosure.

A "solid-state lithium ion conductor material" is understood in the present disclosure to mean a material that is composed of material that conducts lithium ions and has an ion conductivity of at least $10^{-5}$ S/cm at room temperature.

Suitable materials for the method according to the disclosure are garnet-based ion conductors, such as those described in DE 102014100684 B4, glass ceramics having a NASICON structure, such as LATP and LAGP (for example, DE 10 2018 102 387 B3), although ion conductors having a perovskite structure, such as lithium lanthanum titanate, or amorphous ion conductors, such as, for example, borate or phosphate glasses, are also conceivable. The method according to the disclosure is also suitable for the production of electrode materials that conduct Li ions, such as lithium vanadium phosphate.

The solid-state lithium ion conductor material of the present disclosure is characterized, in particular, in addition to having a high electrical conductivity, by a good sinterability even at relatively low temperatures. Smaller particle sizes, in particular, which, for example, can be provided by a wet grinding in accordance with the disclosure, bring about a high sintering activity.

The present disclosure further relates to the use of the solid-state lithium ion conductor materials in the form of a powder in batteries or rechargeable batteries, preferably lithium batteries or rechargeable lithium batteries, in particular separators, cathodes, anodes, or solid-state electrolytes.

The lithium ion-conducting powder materials according to the disclosure, prepared by contact with water (steam), can be used alone or together with additional battery materials; for example, they can be sintered to form a purely inorganic, ceramic membrane or used as an electrolyte that is incorporated as a filler in polymer electrolytes or in polyelectrolytes in rechargeable lithium ion batteries, in particular in solid-state lithium ion batteries (all-solid-state batteries, ASSB). On the one hand, utilization as a separator is possible in this case. Incorporated between the electrodes, it protects them against an undesired short circuit and thereby ensures the functionality of the entire system. To this end, the corresponding composite can be applied either as a layer onto one electrode or onto both electrodes or can be integrated as a free-standing membrane as a solid-state electrolyte in the battery. On the other hand, co-sintering or compounding with the electrode materials is possible. In this case, the solid-state electrolyte brings about the transport of the relevant charge carriers (lithium ions and electrons) toward or away from the electrode materials and toward or away from the conductive electrodes, depending on whether the battery is just then being discharged or charged.

The present disclosure will be explained below in detail on the basis of examples, without any limitation to these examples.

EXEMPLARY EMBODIMENTS

Exemplary Embodiment 1

Production example of a solid-state lithium ion conductor material that crystallizes based on a garnet structure, as exemplified by lithium lanthanum zirconium oxide (LLZO) as a low-water powder.

The production takes place using the method according to the disclosure by way of a heating process in the form of a melting process, free cooling of the melt, coarse comminution under dry conditions, wet grinding in water with subsequent freeze drying, and thermal treatment at 700° C. under dry $N_2$ atmosphere.

The low-water LLZO powder in accordance with exemplary embodiment 1 was prepared as described below:
a) Preparation of a Nb-Doped LLZO Melt as a Hot Intermediate Product A so-called skull crucible was used, as described, for instance, in DE 199 39 782 C1. In skull technology, a water-cooled crucible is used, in which, during melting, a cooler protective layer composed of the material to be melted is formed. In accordance therewith, no crucible material is released during the melting. The energy input in the melt is accomplished by means of high-frequency in-coupling into the molten material via the surrounding induction coil. One condition in this case is the adequate conductivity of the melt, which, in the case of a lithium garnet melt, is afforded by the high lithium content. During the fusion operation, vaporization of lithium ensues and can easily be corrected by a lithium excess. To this end, work is conducted with a slight excess of lithium.

In the example, $La_2O_3$, $Li_2CO_3$, $Nb_2O_5$, and $ZrO_2$ were used as a batch mixture in order to produce a Nb-doped lithium lanthanum zirconate with a nominal composition of $Li_{7+x}La_3Zr_{1.5}Nb_{0.5}O_{12}$. The raw materials were mixed together in accordance with the composition and placed in the skull crucible, which was open at the top. The batch mixture had to be preheated initially in order to achieve a certain minimum conductivity. For this purpose, a burner heating was used. After the coupling temperature had been reached, the further heating and homogenization of the melt was achieved by high-frequency in-coupling via the induction coil. In order to improve the homogenization of the melt, stirring was conducted with a water-cooled agitator.
b) Preparation of a Solid Block Made of Nb-Doped LLZO as a Cold Intermediate Product The LLZO melt produced in the skull crucible is allowed to solidify directly by switching off the high-frequency in-coupling via the surrounding induction coil. The thus cooled intermediate product is obtained as a solid block.
c) Dispensing with a Ceramization During the direct solidification of the melt, the LLZO material exhibits a spontaneous crystallization, so that a subsequent ceramization treatment can be dispensed with.
d) Preparation of a Fine Powder Loaded with Residual Water and Made of Nb-Doped LLZO For the production of a powder still loaded with residual water and composed of the block made of Nb-doped LLZO material, the following comminution steps are carried out:

First, the solid block is broken apart with a hammer and chisel into smaller broken fragments. Subsequently, these broken fragments are fed to a jaw crusher in one pass or in a plurality of passes until broken fragments with a size of max. 10 mm in the longest extension are formed. The latter are ground in a disk mill of the Pulverisette 13 classic model of the Fritsch company to a size of $d_{99}$<100 μm. This coarse powder is subsequently sieved to obtain a particle size of $d_{99}$<63 μm.

1 kg of the coarse-ground Nb-doped LLZO powder with a particle size of <63 μm is dispersed in 2.33 L of water with as little agglomerate formation as possible by use of a dissolver (a disk stirrer). Subsequently, the suspension is poured into the feed tank of an agitator ball mill and ground for 2.5 h using a grinding chamber with a pin mill agitator and employing the multi-passage mode of operation. In this case, the grinding chamber is filled with grinding balls composed of $ZrO_2$ (degree of filling: 74%), which have a diameter of about 1 mm. The grinding is terminated when 50% of the particles present in the grinding classifier have a diameter of approximately 0.24 μm, 90% have a diameter of about 0.53 μm, and 99% have a diameter of about 0.85 μm. The measurement of the particle sizes is made with the use of the statistical light scattering method on a particle size measurement instrument of the CILAS company, model 1064. The measurement is carried out in water (refractive index: 1.33) as a medium and is analyzed according to the Mie method (Re=1.8, Im=0.8).

After the grinding, the grinding classifier is subjected to a drying in a freeze drier. For this purpose, it is first poured out over a large area in product trays that are provided for this intended use and then frozen at a temperature of −30° C. Subsequently, a vacuum, which corresponds to the value required for sublimation (for water <6.11 mbar) is applied. By subsequent successive heating of the bottoms of the product tray, the frozen water is gradually and gently sublimated off from the solid grinding classifier residue in a time period of about 20 h.

With the help of the method of temperature-fractionated carbon phase analysis (in accordance with DIN 19539), the sum obtained from the TOC content (temperature-dependent differentiation of the total organic carbon) and the TIC content (temperature-dependent differentiation of the total inorganic carbon) of the LLZO powder that has been wet-ground in water is determined to be 0.4%, where the detected carbon is predominantly inorganic carbon. The water content is determined to be 25%.

e) Preparation of a Fine Powder Freed of Residual Water and Made of Nb-Doped LLZO In order to reduce the loading with water and the very small amounts of carbonate, the LLZO powder is placed, immediately after a freeze drying, directly in a nitrogen-gas-circulated furnace of the N20/H type of the Nabertherm company and baked out for 4 h at 700° C.

After the baking out, the LLZO powder is taken from the cooled-down nitrogen-gas-circulated furnace and vacuum-packed directly in pouches made of aluminum composite film.

With the help of the method of temperature-fractionated phase analysis (in accordance with DIN 19539), the TIC content (temperature-dependent differentiation of the total inorganic carbon) of the LLZO powder that has been wet-ground in water and, after freeze drying in vacuum, has been baked out at 700° C. for 4 h is determined to be 0.10%; the water content is determined to be 0.8%.

For the purposes of quality control, an x-ray diffractogram (XRD) of the baked-out powder is obtained. The obtained x-ray diffractogram is depicted in FIG. 1. It supplies no indication of the formation of undesired foreign phases, in particular lithium-deficient phases, such as, for example, pyrochlor $La_2Zr_2O_7$, which could lead to a drastic reduction in the conductivity. It exhibits solely the reflections of the cubic modification of the Nb-doped LLZO.

0.4 g of the powder is pressed uniaxially in a steel die with application of a force of 30 kN to form a green body with a diameter of 10 mm and a thickness of 2-3 mm. Subsequently, the green body is compressed at 1130° C. for 30 min to form a sinterling with a density of 90%. The test specimen is provided with a layer of gold on both sides and its conductivity is measured at room temperature with the help of electrochemical impedance spectroscopy (EIS). After analysis of the measurement data, a conductivity value of $6.3 \times 10^{-4}$ S/cm is determined in this case.

Exemplary Embodiment 2

Production example of a solid-state lithium ion conductor material that crystallizes based on a garnet structure, as exemplified by lithium lanthanum zirconium oxide (LLZO) as a low-water powder.

The production takes place using the method according to the disclosure by way of a heating process in the form of a melting process, free cooling of the melt, coarse comminution under dry conditions, fine grinding on a steam jet mill, and thermal treatment at 700° C. under dry $N_2$ atmosphere.

The low-water LLZO powder in accordance with exemplary embodiment 2 was prepared as described below:

a) Preparation of a Nb-Doped LLZO Melt as a Hot Intermediate Product

The production takes place analogously to exemplary embodiment 1.

b) Preparation of a Solid Block Made of Nb-Doped LLZO as a Cold Intermediate Product The production takes place analogously to exemplary embodiment 1.

c) Dispensing with Ceramization

The explanations in regard to exemplary embodiment 1 likewise apply in this case.

d) Preparation of a Fine Powder Loaded with Residual Water and Composed of Nb-Doped LLZO The following comminution steps are carried out for the production of a powder that is still loaded with residual water from the solid block composed of Nb-doped LLZO material:

First, the solid block is broken apart into smaller broken fragments with a hammer and chisel. Subsequently, the broken fragments are fed to a jaw crusher in one pass or in a plurality of passes to form broken fragments with a size of max. 10 mm in the longest extension. The latter are ground on a disk mill of the Pulverisette 13 classic model of the Fritsch company to a size of $d_{99}<1$.

5 kg of coarse-ground Nb-doped LLZO powder with a particle size of <1 mm is placed in a steam-jet mill of the type s-Jet 25 of the Netzsch company. The jet grinding takes place through a ceramic nozzle with the use of superheated steam as the grinding medium and an applied pressure of 10 bar. A powder fraction is obtained with the downstream classifier and, after separation in a cartridge filter, has a particle size distribution with $d_{50}=0.9$ µm, $d_{90}=1.6$ µm, and $d_{99}=2.6$ µm. The measurement of the particle sizes is made with the use of the statistical light scattering method on a particle size measurement instrument of the CILAS company, model 1064. The measurement is carried out in water (refractive index: 1.33) as a medium and is analyzed according to the Mie method (Re=1.8, Im=0.8).

With the help of the method of temperature-fractionated carbon phase analysis (in accordance with DIN 19539), the sum obtained from the TOC content and TIC content of the LLZO powder that has been wet-ground in water is determined to be 5%, with the detected carbon being predominantly inorganic carbon. The water content is determined to be 5.1%.

e) Preparation of a Fine Powder Freed of Water and Composed of Nb-Doped LLZO

In order to reduce the loading with water and the very small amounts of carbonate, the LLZO powder is placed, immediately after a freeze drying, directly in a nitrogen-gas-circulated furnace of the type N20/H of the Nabertherm company and baked out for 4 h at 700° C.

After the baking out, the LLZO powder is removed from the cooled nitrogen-gas-circulated furnace and vacuum-packed directly in pouches made of aluminum composite film.

With the help of the method of temperature-fractionated carbon phase analysis (in accordance with DIN 19539), the TIC content of the LLZO powder, which has been wet-ground in water and, after freeze drying in vacuum, baked out at 700° C. for 4 h, is determined to be 0.1%. The water content is 0.9%. For the purposes of quality control, an x-ray diffractogram (XRD) of the baked-out powder is obtained. The obtained x-ray diffractogram is depicted in FIG. 2. It supplies an indication of the formation of undesired lithium-deficient phases, such as, for example, pyrochlor $La_{0.33}NbO_3$, $La_2Zr_2O_7$, and $La_2O_3$. However, the fraction thereof is so small that the conductivity is impaired only to a very small extent.

0.3 g of the powder is pressed uniaxially in a corresponding die with application of a force of 30 kN to form a green body with a diameter of 10 mm and a thickness of 2 to 3 mm. Subsequently, the green body is compressed at 1130° C. for 30 min to form a sinterling with a density of 92%. The test specimen is provided with a layer of gold on both sides and its conductivity is measured with the help of electrochemical impedance spectroscopy (EIS) at room temperature. After evaluation of the measurement data, a conductivity value of $2 \times 10^{-4}$ S/cm is determined.

Exemplary Embodiment 3

Production example of a solid-state lithium ion conductor material based on the NASICON structure, as exemplified by lithium aluminum titanium phosphate (LATP) as a low-water powder.

The production takes place using the method according to the disclosure by way of a heating process in the form of a melting process, quenching of the melt in water contact, ceramization of the dried granulate particles, coarse comminution of the granulate particles under dry conditions, wet grinding in water with subsequent freeze drying, and thermal treatment at 700° C. under dry $N_2$ atmosphere.

a) Preparation of a Green Glass Melt for Boron-Containing LATP as a Hot Intermediate Product A starting glass for a final lithium-ion-conducting phosphate-based glass ceramic of the composition 5.5% $Li_2O$, 3.7% $Al_2O_3$, 33.1% $TiO_2$, and 55.5% $P_2O_5$, and 2.2% $B_2O_3$ was fused in an outlet crucible at a temperature of 1650° C. For complete homogenization, the glass melt was kept in the chosen melt assembly at a temperature of 1600° C. under a flow of $O_2$ gas.

b) Preparation of a Granulate Composed of Boron-Containing LATP Green Glass as a Cold Intermediate Product The glass produced by way of a melting process is guided in the liquid state (viscosity of 0.1 to 1 dPa sat a temperature of 1450° C. to 1600° C.) in a jet onto a "water chute". Water flows on this water chute at high velocity (throughput of 0.1-3 m³/min, preferably 1.7 m³/min) by way of an inclined stainless steel channel (angle of inclination 10-75°, preferably 45°). In this case, the entire wall of the channel is covered with a film of water on the bottom. When the melt impinges on the flowing film of water, the melt jet is divided into fine droplets. The diameter of the droplets is dependent on the distance of the melt feed from the chute, the angle of inclination of the chute and, in particular, the adjusted quantity of water flow. The process is conducted such that the diameter is less than 20 mm, preferably less than 10 mm, especially preferred 0.5-1 mm. Accordingly, the droplets have no direct contact with the underlying steel material. A cushion of vapor forms at the point of contact with the water film, so that a direct contact of the glass melt with the liquid water is prevented at this point. The droplets then move in a trajectory toward a collection vessel or they are entrained by the jet of water, into which they can fall back owing to a cover lying above the water channel. Immediately after the comminution of the melt jet into droplets or during the time period of their flight movement, the droplets solidify. When they impinge in the collection tank or at the wall of the cover, they are already solid, but still very hot (>700° C.) and accordingly above the ceramization temperature determined by means of a DTA measurement (differential thermal analysis). The collection vessel is filled or flushed with a cooling medium (in the present case: water). The (solid) particles are thereby cooled so rapidly upon immersion that no (or only a slight degree of) crystallization ensues. Accordingly, a nearly totally amorphous glass (ceramic) granulate is obtained (crystal phase fraction in accordance with x-ray diffractometry analyzed according to the Rietveld method of <15%).

After cooling, the glass frit particles are separated from the water serving as the cooling medium by use of a sieve and are dried in the drying cabinet at 150° C. for 12 h.

c) Ceramization of the Green Glass Frit Particles, Composed of Boron-Containing LATP For the production of the actual lithium ion-conducting LATP phase having a NASICON structure, the dried green glass granulate particles are ceramized for 1-12 h at 800° C. -980° C., preferably 6 h at 950° C.

In the course thereof, any residual glass water still present is expelled from the material to the largest extent possible. The water content is determined with the use of the method of temperature-fractionated carbon phase analysis (in accordance with DIN 19539), which can also be drawn on for determining this characteristic value, to be 0.05%.

d) Preparation of a Fine Powder Loaded with Residual Water and Composed of Boron-Containing LATP For the production of a powder that is still loaded with residual water from the glass ceramic granulate that is composed of the boron-containing LATP, the following comminution steps are carried out:

First of all, the particles present are placed on a disk mill of the Pulverisette 13 classic model of the Fritsch company and ground therewith to a particle size of <100 μm.

1 kg of this coarse-ground, boron-containing LATP powder is dispersed in 2.33 L of water with as little agglomerate formation as possible with the use of a dissolver. Subsequently, the suspension is poured into the feed tank of an agitator ball mill and ground using a grinding chamber with a pin mill agitator and employing the multi-passage mode of operation for 2.5 h. In this case, the grinding chamber is filled with grinding balls made of $ZrO_2$ (degree of filling: 74%), which have a diameter of about 0.8 mm. The grinding is terminated when 50% of the particles that are present in the grinding classifier have a diameter of approximately 0.95 μm, 90% have a diameter of about 2.43 μm, and 99% have a diameter of about 3.86 μm. The measurement of the particle sizes is made with the use of the statistical light scattering method on a particle size measurement instrument of the CILAS company, model 1064. The measurement is carried out in water (refractive index: 1.33) as a medium and is analyzed according to the Mie method (Re=1.8, Im=0.8).

After the grinding, the grinding classifier is subjected to a drying in a freeze drier. For this purpose, it is first poured out over a large area in product trays that are provided for this intended use and then frozen at a temperature of −30° C. Subsequently, a vacuum, which corresponds to the value required for sublimation (for water <6.11 mbar) is applied. By subsequent successive heating of the product tray bottoms, the frozen water is gradually and gently sublimated off in a time period of about 20 h from the solid classifier residue.

By use of the method of temperature-fractionated carbon phase analysis (in accordance with DIN 19539), the sum obtained from the TOC content and the TIC content of the LATP powder that has been wet-ground in water is determined to be below the limit of detection of 0.01%. The water content is determined to be 2.5%.

e) Preparation of a Fine Powder Freed of Residual Water and Composed of Boron-Containing LATP In order to reduce the loading with water and the very small amounts of carbonate, the LATP powder is placed, immediately after a freeze drying, directly in a nitrogengas-circulated furnace of the type N20/H of the Nabertherm company and baked out for 4 h at 400° C.

After the baking out, the LATP powder is taken from the cooled-down nitrogen-gas-circulated furnace and vacuum-packed directly in pouches made of aluminum composite film.

By use of the method of temperature-fractionated carbon phase analysis (in accordance with DIN 19539), the TIC content of the LATP powder that has been wet-ground in water and, after freeze drying in vacuum, has been baked out at 400° C. for 4 h is determined to be below the limit of detection of 0.01%. The water content amounts to 0.7%.

For the purposes of quality control, an x-ray diffractogram (XRD) of the baked-out powder is obtained. The obtained x-ray diffractogram is depicted in FIG. 3. The latter supplies no indication of the formation of undesired foreign phases, in particular lithium-deficient phases, such as, for example, $AlPO_4$ or $TiP_2O_7$, which could lead to a drastic reduction in the conductivity. It exhibits solely the reflections of the LATP crystal.

0.3 g of the powder is pressed uniaxially in a corresponding die with application of a force of 30 kN to form a green body with a diameter of 10 mm and a thickness of 2 to 3 mm. Subsequently, the green body is compressed at 800° C. for 3 h to form a sinterling with a density of 90%. The test specimen is provided with a layer of gold on both sides and its conductivity is measured at room temperature with the help of electrochemical impedance spectroscopy (EIS). After analysis of the measurement data, a conductivity value of $9 \times 10^{-4}$ S/cm is determined in this case.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure is not limited to the particular embodiment(s) disclosed as the best mode contemplated, but that the disclosure will include all embodiments falling within the scope of the appended claims.

What is claimed is:

1. A method for producing a solid-state lithium ion conductor material, the method comprising the following steps:
   (1) providing starting products of a solid-state lithium ion conductor material based on a lithium lanthanum zirconium oxide (LLZO),
   wherein the starting products have an excess of lithium in comparison to a stochiometric composition to compensate for loss due to contact with water;
   (2) carrying out at least one heating process with the starting products of the solid-state lithium ion conductor material to obtain an intermediate product, wherein the heating process is selected from the group consisting of a melting process, a sintering process, a ceramization process, a calcination of a sol-gel precursor, and a bottom-up synthesis in the pulsation reactor;
   (3) feeding the intermediate product onto a channel of a water chute that has an entire bottom surface covered with flowing cold water to cool or quench the intermediate product by contact with the cold water and to form droplets of the intermediate material and controlling a diameter of the droplets by adjusting: a flow rate of the cold water, a feed distance from the water chute, and an angle of inclination of the water chute; and
   (4) processing the intermediate product to produce a powder in at least one comminution step.

2. The method according to claim 1, wherein the starting products have an excess of lithium in a molar range of 2% to 100% compared to a stochiometric composition.

3. The method according to claim 1, wherein, in step (3), when the intermediate product is cooled or quenched, the intermediate product is comminuted at the same time.

4. The method according to claim 3, wherein the comminution in step (3) is an atomization of the intermediate product to form droplets or the separation of the intermediate product into particles.

5. The method according to claim 1, wherein, in step (3), the intermediate product is in a liquid state and comes into contact with cold water, and is atomized into droplets with the use of the water chute.

6. The method according to claim 5, and wherein the angle of inclination of the water chute in the range of 10-75°, and the adjusted amount of water flow is in the range of 0.1-3 $m^3$/min, and the adjusted diameter of the droplets is less than 20 mm.

7. The method according to claim 6, wherein the adjusted diameter of the droplets is between 0.5 mm and 1 mm.

8. The method according to claim 1, wherein, after step (3) and prior to step (4), an intermediate step is carried out, the intermediate step comprising the annealing of the cooled intermediate product for adjustment of a desired crystal structure with a defined temperature-time program comprising a heating, a holding, and a cooling step and for the heating, holding, and cooling step in each case intermediate holding steps if needed.

9. The method according to claim 8, wherein the intermediate step is carried out repeatedly to adjust a desired crystal phase composition and the crystal fraction.

10. The method according to claim 1, further comprising a method step (5) after step (4), wherein step (5) comprises the carrying out of a thermal treatment for removal of residual water remaining in the intermediate product, wherein the thermal treatment is at a temperature of at least 200° C., wherein the thermal treatment is carried out in the absence of $CO_2$ in an ambient atmosphere, and wherein the thermal treatment results a powder of a solid-state lithium ion conductor material with a water content of <1.0 wt %.

11. The method according to claim 10, wherein step (5) is carried out at a temperature of at least 300° C.

12. The method according to claim 1, wherein, in the cooling process of step (4), the raw product is transformed into powder form with a desired particle size and particle size distribution, the transformation comprising at least one of the following steps:
   comminution with hammer and chisel;
   comminution with roller crusher and/or jaw crusher;
   comminution with ball mill and/or hammer mill;
   comminution with ball mill, impact mill, and/or planetary mill;
   comminution with vibrating disc mill;
   comminution with counterjet mill, spiral jet mill, and/or steam-jet mill;
   comminution with dry ball mill and/or wet ball mill;
   comminution with dry agitator ball mill and/or wet agitator ball mill; and
   comminution by high-energy grinding in high-kinetic rotary ball mill.

13. The method according to claim 1, further comprising, in step (4), contacting the intermediate product with cold water while processing the intermediate product, and subsequently drying the intermediate product.

14. The method according to claim 1, further comprising, in step (3), drying the intermediate product after the cooling or quenching the intermediate product, and in step (4), contacting the intermediate product with cold water during the processing the intermediate product, and subsequently drying the intermediate product.

15. The method according to claim 1, wherein the at least one comminution step in step (4) comprises a plurality of comminution steps.

16. The method according to claim 1, wherein the diameter is controlled so that the droplets have a diameter of less than 20 mm.

17. The method according to claim 1, wherein the water flow rate is adjusted in a range of 0.1 to 3 $m^3$/min.

18. The method according to claim 1, wherein the angle of inclination is adjusted from 10° to 75°.

19. The method according to claim 1, wherein step (4) comprises creating small frit particles directly supplied to a fine grinding process, without a multistage coarse comminution process.

20. The method according to claim 19, wherein the fine grinding process is performed while the intermediate product is in contact with water.

21. A method for producing a solid-state lithium ion conductor material, the method comprising the following steps:
(1) providing starting products of lithium aluminum titanium phosphate (LATP), wherein the starting products have an excess of lithium in comparison to a stochiometric composition;
(2) carrying out at least one heating process with the starting products of the solid-state lithium ion conductor material to obtain an intermediate product, wherein the heating process is selected from the group consisting of a melting process, a sintering process, a ceramization process, a calcination of a sol-gel precursor, and a bottom-up synthesis in the pulsation reactor;
(3) cooling or quenching the intermediate product by contact with cold water while the intermediate product is in a liquid state when contacted with the cold water so that the intermediate product is atomized into droplets, and
wherein the cold water is provided by a water chute and after an initial contact with the cold water, the droplets are produced from a cushion of vapor resulting from the initial contact so that further contact of the droplets with the water is prevented; and
(4) processing the intermediate product to produce a powder in at least one comminution step.

22. The method according to claim 21, wherein, after step (3) and prior to step (4), an intermediate step of annealing the droplets is carried out with a defined temperature-time program to adjust a desired crystal phase composition and the crystal fraction of the droplets.

23. The method according to claim 21, wherein step (3) comprises:
feeding the intermediate product onto a channel of a water chute that has an entire bottom surface covered with flowing cold water to cool or quench the intermediate product by contact with the cold water and to form droplets of the intermediate material; and
controlling a diameter of the droplets by adjusting a flow rate of the cold water, adjusting a feed distance from the water chute, and adjusting an angle of inclination of the water chute.

24. A method for producing a solid-state lithium ion conductor material, the method comprising the following steps:
(1) providing starting products of a solid-state lithium ion conductor material based on a lithium lanthanum zirconium oxide (LLZO),
wherein the starting products have an excess of lithium in comparison to a stochiometric composition to compensate for loss due to contact with water;
(2) carrying out at least one heating process with the starting products of the solid-state lithium ion conductor material to obtain an intermediate product, wherein the heating process is selected from the group consisting of a melting process, a sintering process, a ceramization process, a calcination of a sol-gel precursor, and a bottom-up synthesis in the pulsation reactor;
(3) cooling or quenching the intermediate product by contact with cold water;
(4) carrying out an intermediate step comprising annealing the cooled intermediate product for adjustment of a desired crystal structure with a defined temperature-time program comprising a heating, a holding, and a cooling step and for the heating, holding, and cooling step in each case intermediate holding steps if needed, wherein the intermediate step is carried out repeatedly to adjust a desired crystal phase composition and the crystal fraction; and
(5) processing the intermediate product to produce a powder in at least one comminution step.

25. A method for producing a solid-state lithium ion conductor material, the method comprising the following steps:
(1) providing starting products of lithium aluminum titanium phosphate (LATP),
wherein the starting products have an excess of lithium in comparison to a stochiometric composition;
(2) carrying out at least one heating process with the starting products of the solid-state lithium ion conductor material to obtain an intermediate product, wherein the heating process is selected from the group consisting of a melting process, a sintering process, a ceramization process, a calcination of a sol-gel precursor, and a bottom-up synthesis in the pulsation reactor;
(3) feeding the intermediate product onto a channel of a water chute that has an entire bottom surface covered with flowing cold water to cool or quench the intermediate product by contact with the cold water to form droplets of the intermediate material;
(4) controlling a diameter of the droplets by adjusting a flow rate of the cold water, adjusting a feed distance from the water chute, and adjusting an angle of inclination of the water chute; and
(5) processing the intermediate product to produce a powder in at least one comminution step.

* * * * *